Sept. 6, 1960 H. G. COOPER, JR 2,951,961

ELECTRON BEAM DEFLECTION SYSTEM

Filed May 28, 1959 3 Sheets-Sheet 1

INVENTOR
H. G. COOPER, JR.
BY David P. Kelley
ATTORNEY

ELECTRON BEAM DEFLECTION SYSTEM

Filed May 28, 1959 3 Sheets-Sheet 2

INVENTOR
H. G. COOPER, JR.
BY David I. Kelley
ATTORNEY

Sept. 6, 1960 H. G. COOPER, JR 2,951,961

ELECTRON BEAM DEFLECTION SYSTEM

Filed May 28, 1959 3 Sheets-Sheet 3

VERTICAL DEFLECTION

VERTICAL DEFLECTION

HORIZONTAL DEFLECTION

HORIZONTAL DEFLECTION

INVENTOR

H. G. COOPER, JR.

BY

ATTORNEY

United States Patent Office 2,951,961

Patented Sept. 6, 1960

2,951,961

ELECTRON BEAM DEFLECTION SYSTEM

Howard G. Cooper, Jr., Morristown, N.J., assignor to Bell Telephone Laboratories, Incorporated, New York, N.Y., a corporation of New York Filed May 28, 1959, Ser. No. 816,499

7 Claims. (Cl. 313—76)

This invention relates to cathode ray tubes, and, more particularly, to cathode ray tubes of the type having means for deflecting the ray in a plurality of coordinates.

In general, cathode ray tubes which utilize deflection in a plurality of coordinates, such as, for example, the horizontal and vertical coordinates, find greatest utility in such applications as television camera and picture tubes, storage tubes, oscilloscopes, and various types of quantizing arrangements. In operation, the electron beam is focused into a thin pencil beam and then deflected in response to signals applied to the deflection system to impinge upon a discrete area or areas of the target. Ordinarily it is not difficult to focus an undeflected beam into the desired pencil shape of minimum cross-section. However, when the beam is deflected it becomes distorted and enlarged, the degree of enlargement increasing in proportion to the amount of deflection. It can readily be seen that where a high degree of resolution is desirable, such distortion represents a serious problem. Thus, for example, in a storage tube where it is desired to store large numbers of bits of information, the number of bits that can be stored is limited by the ultimate beam size; hence an enlarged beam reduces the number of available storage areas, with a consequent reduction in the capacity of the storage tube.

One of the major causes of deflection defocusing, particularly in tubes which utilize electrostatic deflection, is the tendency of a pair of deflecting plates to act as a converging lens in the plane of deflection when deflection voltages are applied. The convergence of the electrons in the beam as a result of this effect produces a focal point some distance in front of the target, and the beam converges to this point and diverges beyond it, finally striking the target after it has become enlarged. In a copending application Serial No. 608,532 of H. G. Cooper, Jr. and Marion E. Hines, filed September 7, 1956, now U.S. Patent No. 2,884,559, issued April 28, 1959, there is disclosed a dynamic correction system for substantially eliminating the converging lens effect of the deflection plates. In that system there is provided a four element lens between the electron gun and the first set of deflecting plates, which lens responds to deflection signals applied to the deflection plates to vary the degree of focusing of the lens itself to compensate for the degree of defocusing introduced by the deflection plates. Such a system has the virtue of correcting the converging lens effect while permitting tube length to be held to a minimum.

A system of the type just described is based upon the assumption that the electric field in the deflection system is two-dimensional, that is, it exists in only two of the three Cartesian coordinates when vertical and horizontal deflection is all that is being used. Thus for a pair of vertical deflection plates the electric field is assumed to be a function of the vertical coordinate and the longitudinal coordinate, and independent of the horizontal coordinate. For purposes of identification, the convergent lens action producing deflection defocusing in the plane of the deflection will hereinafter be referred to as "normal" deflection defocusing.

In studying and observing beam behavior in a deflection system I have found that there is a second type of deflection defocusing which occurs and which shall be referred to hereinafter as "abnormal" deflection defocusing. This abnormal deflection defocusing results from the fact that the electrostatic field is not in actuality two-dimensional as previously assumed, but, on the contrary, is three-dimensional, and the defocusing action produces a beam enlargement at the target in the coordinate at right angles to the normal deflection defocusing beam enlargement. Thus when the beam has, for example, been deflected only in the vertical coordinate there will be the normal deflection defocusing effect of an elongation of the beam spot on the target in the vertical direction, and there will also be an increase in the size of the beam in the horizontal direction as a result of the abnormal deflection defocusing. It has also been observed that this abnormal deflection defocusing becomes more pronounced the closer together the two sets of deflection plates are placed within the tube. Thus any effort to cut down on tube length, an important consideration in almost any application, by reducing the spacing between the vertical set of deflection plates and the horizontal set of deflection plates tends to produce an increase in the degree of abnormal deflection defocusing. As will be explained more fully hereinafter, the abnormal deflection defocusing is produced by a fringing field which exists between the two sets of deflection plates and, in general, in contradistinction to normal focusing, a convergence of the beam is produced in the coordinate plane normal to the plane of deflection.

Insofar as I am aware, nowhere in the prior art is the existence of this abnormal deflection defocusing recognized. As will be discussed more fully hereinafter, simple shielding arrangements per se are not sufficient to eliminate the abnormal deflection defocusing and, in some cases, such shields may actually increase the amount of defocusing. In addition, as will be discussed hereinafter, prior art shielding arrangements tend to decrease the deflection sensitivity of the beam as well as limit the amount of deflection obtainable.

Accordingly, it is an object of this invention substantially to eliminate abnormal deflection defocusing effects in a cathode ray tube.

It is another object of this invention to eliminate such defocusing effects without materially increasing the tube length or the length of the deflection system itself.

It is a still further object of this invention to eliminate substantially completely any interaction of electric fields between the respective sets of deflection plates, without materially impairing deflection sensitivity or limiting the degree of deflection obtainable.

These and other objects of this invention are attained in one specific embodiment wherein a cathode ray storage tube of, for example, the barrier grid type, comprises a deflection system having a first set of electrostatic deflecting plates for deflecting the beam in the vertical plane, a second set of electrostatic deflecting plates for deflecting the beam in the horizontal plane, and a pair of apertured electrostatic shielding members located between the vertical set of deflection plates and the horizontal set of deflection plates. The shield member closest to the exit end of the vertical deflection plates has a rectangular aperture having its longest dimension parallel to the vertical deflection plate width and the shield member adjacent the entrance end of the horizontal deflection plates has a rectangular aperture with its long dimension parallel to the horizontal deflection plate width.

From a qualitative standpoint, in a cathode ray tube where the vertical deflection plates are closer to the electron gun than the horizontal deflection plates, abnormal deflection focusing arises principally when the beam is deflected in the vertical plane. Since deflection distortion occurs primarily at large deflection angles, it must necessarily result from irregularities in that portion of the electric field where the beam exits from the vertical deflection plates. This can be readily understood when it is realized that the beam enters the vertical deflection system at approximately the same point regardless of the deflection angle, but that it exits from the vertical deflection system at a point dependent upon the deflection angle. It follows, therefore, that since the degree of defocusing depends upon the deflection angle, it is the exit fringing fields that are the major cause of the defocusing. When the horizontal deflection plates are at a different potential than the vertical deflection plates, the fringing fields at the exit of the vertical deflection plates extend between those plates and the horizontal plates. As will be explained more fully hereinafter, as a result of this phenomenon there will be set up forces acting upon the beam which tend to converge the beam in the horizontal direction when the beam is deflected vertically. In the same manner, the entrance fields of the horizontal deflection plates produce abnormal deflection defocusing.

One obvious expedient for eliminating this effect is to space the vertical set of plates from the horizontal set a sufficient distance to prevent field interaction. However, this solution results in abnormal tube lengths with the attendant disadvantages of increased difficulty in focusing the beam, increased tube fragility, increased manufacturing costs, and, where space is a factor, an increase in the amount of space that is occupied by the tube. A second alternative, which avoids these disadvantages, is shielding.

When a single shielding member is used between the two sets of deflection plates, both the vertical and horizontal fields partially terminate on the shield and there are produced field aberrations which tend to distort the beam. In addition, because the shield must necessarily be apertured for passage of the beam, there are produced field distortions at the aperture edges. This latter effect can be cured to a large extent by enlarging the aperture in the dimension at right angles to the deflection coordinate. However, when two deflection coordinates are involved, this remedy results in an exceedingly large aperture through which the electrostatic fields pass, thereby materially reducing the shielding action, with a consequent increase in abnormal defocusing.

In order that adequate shielding may be obtained while proper aperture size is maintained for both sets of deflection plates, two shielding plates may be used, each having an aperture which is enlarged in only one dimension, the apertures being oriented at right angles to each other. Such a shielding arrangement does, to some extent at least, eliminate the defects inherent in the single shield. However, such a dual shield arrangement has certain faults peculiar to it. Thus, in the past, in order to achieve the desired degree of shielding, it has been believed to be necessary to make the aperture small enough so that the shield overlaps the deflection plates somewhat to prevent fields leaking through the aperture. Such an overlap reduces deflection sensitivity and the total amount of deflection obtainable, and, for extreme degrees of deflection, might actually result in beam interception by the shield member. Furthermore, as will be discussed more fully hereinafter, a high concentration of field is produced at the aperture edge which distorts the beam. I have found that these defects of a dual shield arrangement can be substantially completely eliminated by a proper spacing of the shield members from each other and from the respective pairs of deflection plates. If a proper spacing is observed, the dimensions of the rectangular apertures may be made such that deflection sensitivity is substantially unimpaired, the maximum degree of deflection obtainable is substantially independent of the shield members, there is no interception of the beam by the shield members, and distortion of the beam by aperture edge effects is substantially completely eliminated.

Accordingly it is one feature of my invention that the apertured shielding members are spaced from each other and from the respective pairs of deflection plates in such a manner that optimum shielding is obtained and abnormal deflection defocusing is substantially completely eliminated.

It is another feature of my invention that the short dimension of the rectangular aperture in the shield member adjacent the vertical deflection plates be equal to or greater than the maximum spacing between the two vertical deflection plates.

It is still another feature of my invention that the shortest dimension of the rectangular aperture of the shield member adjacent the horizontal deflection plates is equal to or greater than the maximum spacing between the horizontal deflection plates.

It is a further feature of my invention that the spacing between the two shield members be equal to or greater than the smallest dimension of the rectangular aperture in the shield member adjacent the horizontal deflecting plates.

It is also a feature of my invention that the longest dimension of the rectangular aperture in each of the shielding members be equal to or greater than the maximum width of the adjacent pair of deflecting plates.

These and other features of my invention will be more completely understood from a consideration of the following detailed description and the accompanying drawing, in which:

Fig. 1 is a diagrammatic representation of a barrier grid storage tube incorporating an embodiment of the present invention;

Figs. 2*a*, 2*b*, and 2*c* depict the behavior of deflecting fields in a deflecting system for a variety of conditions;

Figure 1:
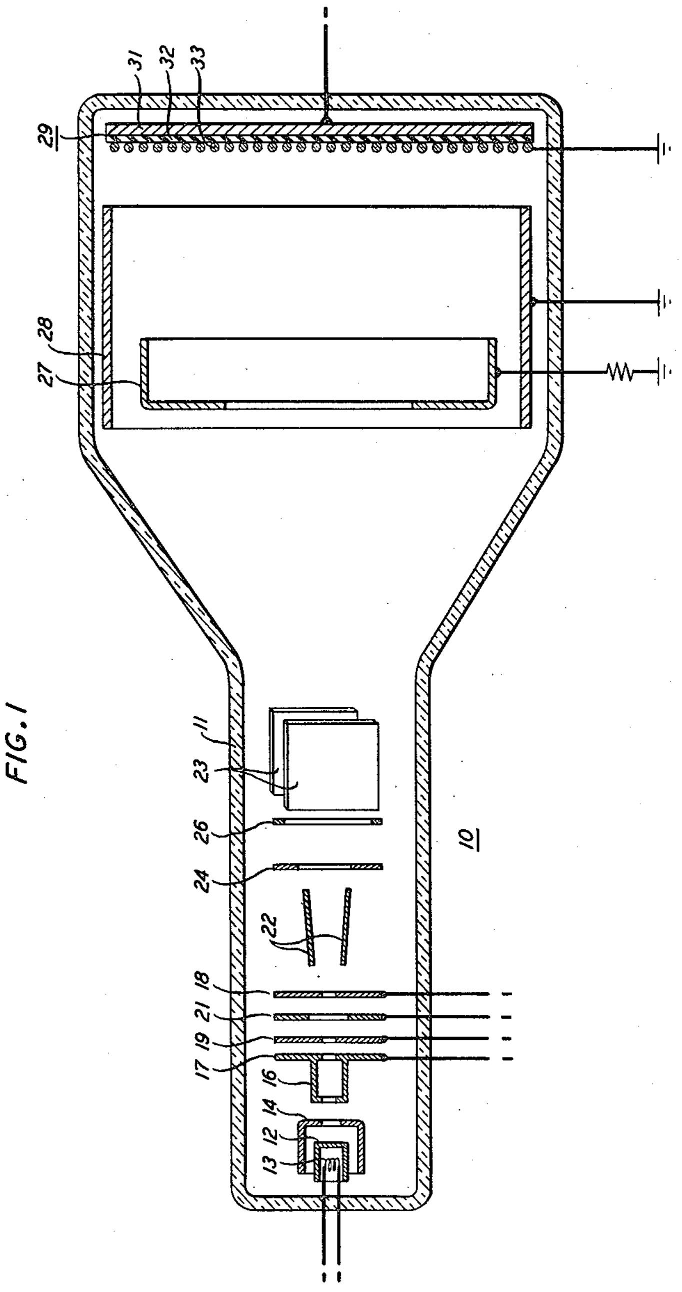

Referring now to the drawings, there is shown in Fig. 1 an illustrative embodiment of the present invention as utilized in a barrier grid storage tube 10. Tube 10 comprises an evacuated envelope 11 of any suitable material, such as glass. Within the envelope is mounted an electron gun structure, shown schematically, which comprises a cathode 12, a heater 13, a control grid 14, and an accelerating anode 16. For simplicity the various potential sources and connections for the electron gun arrangement have not been shown and it is to be understood that they comprise merely conventional arrangements well known in the art.

In order that the electron beam may be focused into a thin pencil beam, and normal deflection defocusing effects substantially eliminated, a dynamic defocusing correction system of the type shown and described in the aforementioned patent of Cooper and Hines is placed adjacent the electron gun. The lens system comprises a first lens electrode 17 having a circular aperture for passage of the beam and a second lens electrode 18 also having a circular aperture for passage of the electron beam. Between lens electrodes 17 and 18 are situated a first apertured correction electrode 19 having an elliptical aperture with its minor axis oriented vertically, as described in the aforementioned patent, and situated between correction electrode 19 and lens electrode 18 is a second correction electrode 21 having an elliptical aperture with its minor axis oriented horizontally. The electrodes 17, 18, 19, and 21 are connected to sources of potential and to control circuits of the type shown and described in the aforementioned patent, but for simplicity these connections are not shown here. Adjacent the lens system is a pair of vertical deflection plates 22 for deflecting the beam in the vertical coordinate. Closely adjacent the vertical deflection plates 22 is a pair of horizontal deflection plates 23 for deflecting the beam in the horizontal coordinate. Situated between the pairs of deflection plates 22 and 23 are first and second apertured shielding members 24 and 26, the configuration and location of which will be discussed more fully hereinafter. Downstream from the horizontal deflection plates 23 are located a collector electrode 27, a shield electrode 28, and a target assembly 29. Target assembly 29 comprises a metallic back plate member 31, a dielectric sheet 32, and a barrier grid 33 positioned directly in front of dielectric sheet 32.

With such a target structure as here shown bits of information in the form of electrostatic charges are deposited on the dielectric sheet 32 and retained there for extended periods of time, within the discrete area where deposited, by the action of the barrier grid 33. The back plate 31, being insulated from the barrier grid 33, functions to control the charge pattern which is laid down by the electron beam by means of variation of potential on the back plate. The reading operation, that is, the detection of stored charges, is accomplished when the electron beam subsequently impinges upon an area where a charge has previously been deposited.

With such a tube as thus far described it is readily apparent that the size of the discrete charge storage areas and consequently the total number of available storage charge areas are dependent at least in part on the size and uniformity of the impinging electron beam. Thus any phenomenon which tends to produce an enlargement of the beam will, by the same token, tend to reduce the number of usable discrete storage areas. As has been priorly pointed out, the normal deflection focusing effects are substantially eliminated in the tube 10 by means of the electrodes 17, 18, 19, and 21, in accordance with the teachings of the aforementioned Cooper and Hines patent, and reference may be had thereto for a complete understanding of such defocusing correction. For a better understanding of the phenomenon of abnormal deflection defocusing, reference should be made to Figs. 2 and 3.

Figure 2C:
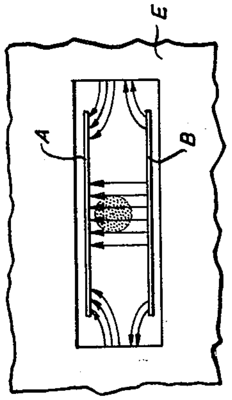
Figure 2B:
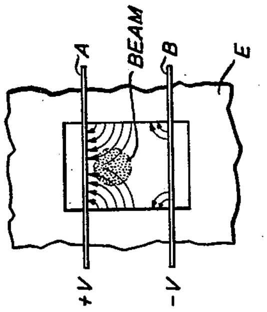
Figure 2A:
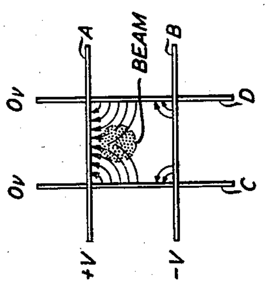

In Fig. 2*a* there is shown a pair of vertical deflecting plates A and B and a pair of horizontal deflecting plates C and D. Impressed upon vertical deflecting plate A is a positive deflecting voltage +V and on plate B there is an equal and opposite negative deflecting voltage −V. For purposes of this illustration the horizontal deflecting plates will be assumed to have no voltage applied thereto. As can be seen, there exist curved electrostatic field lines which extend from plates C and D to the plate A and also similar electrostatic field lines extend from plate B to plates C and D. The beam, which is represented by the shaded area, passes through the field between plates C and D and A, where it is subjected to a convergent force due to the horizontal components of the curved field. This convergent force acts upon the beam in much the same way that the convergent force of normal deflection focusing acts, that is, it forces the beam to a point in some plane in front of the target and beyond that point the beam will diverge, impinging upon the target after becoming enlarged.

In Fig. 2*b* there is shown a field configuration when an apertured shield is used. It can be seen that the field configuration now exists between the sides of the aperture in the shield E and the plates A and B and is substantially the same as the field which is depicted in Fig. 2*a*. In Fig. 2*c* there is shown a field configuration when the aperture in the shield member is greatly elongated in the direction of the width of the vertical deflecting plates. It can be seen that the field aberrations existing between the shield and the plates are now displaced from the area through which the beam passes so that the beam is subjected to a normal two dimensional deflecting field between the plates. If a single shield is to be used it becomes readily apparent that the aperture must also be enlarged in the direction parallel to the horizontal deflecting plate width since the same field aberrations exist between the horizontal plates and the shield. Such an enlargement of the aperture in two coordinates results in a greatly enlarged aperture through which the field lines will leak so that the situation as depicted in Fig. 2*a* will result, although the field strength may be somewhat lessened.

Figure 3:
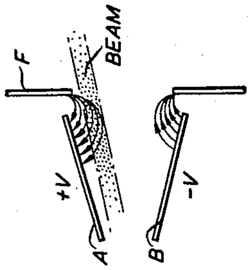
Fig. 3 depicts the aberrations in a deflecting field in one prior art arrangement.

As was pointed out in the foregoing the disadvantages of the single shield may be eliminated by the use of two shields, each having a rectangular aperture so oriented that the long dimension of the rectangular aperture is parallel to the width dimension of the adjacent deflecting plates. However, in the past it has been thought necessary, in order to achieve proper shielding, to decrease the narrow dimension of the rectangular aperture so that it is actually less than the exit aperture of, for example, the vertical deflection plates. Such an arrangement is shown in Fig. 3. It can be seen in Fig. 3 that when there is an overlapping of the shielding member F, there will be a heavy concentration of electric field extending between the deflecting plates and the aperture edge. It is readily apparent that this field will act upon the beam when it is deflected, as depicted in Fig. 3, with a consequent distortion of the beam. In addition, it is readily apparent that the maximum degree of beam deflection is reduced, as is the deflection sensitivity due to the fact that a portion of the field which normally would act to deflect properly now acts on the beam in a different manner; hence the remaining deflecting field is reduced.

Figure 4:
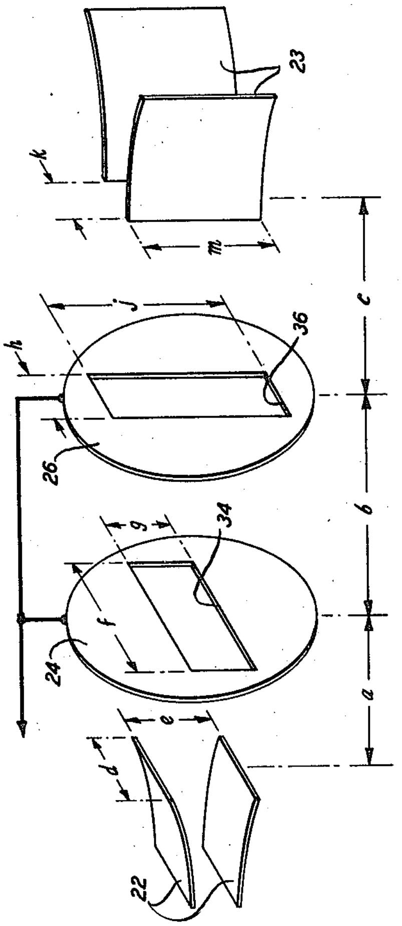
Fig. 4 is a perspective view of the deflection system for the embodiment of Fig. 1; and, Figs. 5*a*, 5*b*, 5*c*, and 5*d* are graphs depicting the deflection field effects on the beam in a device wherein the present invention has been incorporated and where it has not.
Figure 5A:
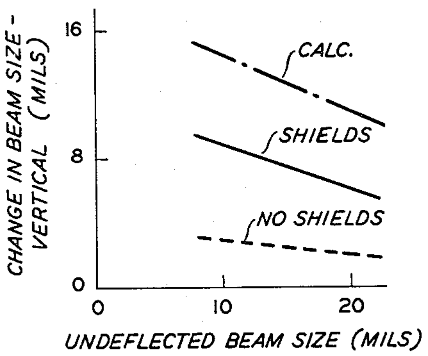
Figure 5B:
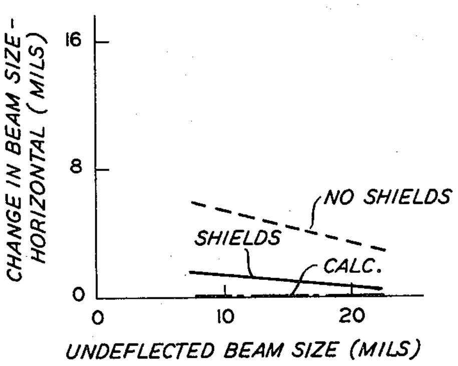
Figure 5C:
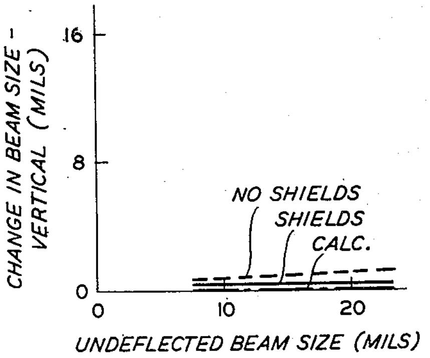
Figure 5D:
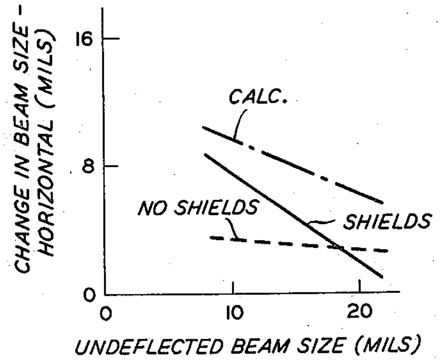

In Fig. 4 there is shown a deflection system in accordance with the principles of my invention. As was pointed out in the discussion of Fig. 1, the deflection system comprises a pair of vertical deflecting plates 22, a first shielding member 24 having a rectangular aperture 34 which is oriented with its long dimension $f$ parallel to the width dimension $d$ of the deflecting plates 22, a second shielding member 26 having a rectangular aperture 36 therein which is oriented with its long dimension $j$ parallel to the width dimension $m$ of horizontal deflecting plates 23. Advantageously plates 24 and 26 are of highly conductive material and are connected together and to a suitable voltage, preferably of a value $V_0$ equal to the average potential on the two deflecting plates. While the deflecting plates are here shown as being connected together by a simple conductor, they may, for example, be connected together by means of a hollow cylindrical shield can, which greatly simplifies mounting problems. In order that the field configuration depicted in Fig. 2*c* may be achieved, the long dimension $f$ of aperture 34 is made equal to or greater than the long dimension $d$ of deflecting plates 22. Further, in order that the edge effects depicted in Fig. 3 may be removed from the region where the beam passes, the short dimension $g$ of aperture 34 is made equal to or greater than the maximum spacing $e$ between the two deflecting plates 22. In a similar manner and for the same reasons the long dimension $j$ of aperture 36 in plate 26 is made equal to or greater than the width $m$ of plates 23 and the short dimension $h$ of the aperture 36 is made equal to or greater than the minimum spacing $k$ between the horizontal deflecting plates 23.

Ordinarily if the shielding plates 24 and 26 were placed between the two sets of deflecting plates in the manner of prior art arrangements, the shielding effect would actually be somewhat less than the shielding produced by a shield member of the type depicted in Fig. 3. However, I have found that there is an optimum spacing for the various elements of the deflection system which, regardless of the actual physical dimensions involved, will produce substantially complete shielding and consequent elimination of abnormal deflection defocusing. It is essential that the spacing *b* between the two deflecting plates be at least equal to and preferably greater than the short dimension *h* of aperture 36. If the spacing *b* is less than that dimension, the plate 24 will be too close to plate 26, and some of the fields which tend to terminate on plate 24, for example, will instead terminate on the plate 26. With this limitation on the dimension *b* I have found that substantially complete shielding obtains when the distance *b* is four times the spacing *a* between plate 24 and vertical deflection plates 22 and four times the spacing *c* between the plate 26 and the horizontal deflecting plates 23. When these values are observed substantially complete elimination of abnormal deflection focusing is obtained. In addition it will be noted that the values here given are not dependent upon the actual physical dimensions of the various elements. Thus the relationships of the dimensions and the spacing as given in the foregoing are applicable to any cathode ray tubes having a deflection system of the type depicted.

In Fig. 5 there are shown a plurality of graphs which demonstrate the operation of the deflection system in a tube of the type shown in Fig. 1, but without a dynamic correction system for correcting normal deflection defocusing.

In Fig. *5a* there is depicted the effect of vertical deflection upon the beam size in the vertical plane for a tube having no shields between the deflecting plates as indicated by the dash line, for a tube having shields as depicted in Fig. 4, as indicated by the solid line, and for the calculated deflection defocusing effect as shown by the dot-dash line. The ordinate of the chart represents change in beam size and the abscissa of the chart represents undeflected beam size. It can be seen that the shields tend to produce more deflection defocusing in the vertical direction than would exist if no shields were used. However, this deflection defocusing is not of concern inasmuch as it is readily eliminated by the correction system disclosed in the aforementioned Cooper and Hines patent.

In Fig. *5b* there is depicted the effect of vertical deflection on the beam size in the horizontal plane. The ordinate of the graph of Fig. *5b* represents change in beam size in the horizontal direction and the abscissa represents undeflected beam size. It can be seen from Fig. *5b* that the calculated value of change in beam size with vertical deflection is zero; however, as evidenced by the dash line, the measured change in beam size in a tube having no shielding members is quite substantial. When the shield members are inserted it can be seen, as evidenced by the solid line, that the change in beam size is reduced almost to the calculated value of zero.

In Figs. *5c* and *5d* there are shown the effects of horizontal deflection on the beam size. In Fig. *5c* it can be seen that the calculated value of the change in beam size in the vertical plane with horizontal deflection is zero, but the measured change in beam size in a tube having no shielding members is quite different from the calculated value as evidenced by the dash line. In a tube having the shield members of Fig. 4, the measured change in beam size is substantially zero as depicted by the solid line. Fig. *5d* corresponds to Fig. *5a* and shows the normal deflection defocusing effects and the effect of the shields which tend to bring normal deflection defocusing closer to the calculated value. Again, as pointed out in connection with Fig. *5a*, this is of no import inasmuch as the dynamic deflection defocusing control of the Cooper and Hines patent eliminates substantially all of the deflection defocusing in that coordinate.

From the foregoing discussion of Fig. 5 it can be readily seen that the shields have the effect of converting the abnormal deflection defocusing into normal deflection defocusing. In other words, with the shields the abnormal deflection defocusing is greatly decreased and the normal deflection defocusing is increased somewhat. Thus in a tube such as depicted in Fig. 1 in which, in addition to the shield members 24 and 26 there is a control lens arrangement of the type disclosed in the aforementioned Cooper-Hines patent, there is substantial complete elimination of abnormal deflection defocusing and/or normal deflection defocusing.

In one experimental tube in which the dual shield arrangement as depicted in Fig. 4 was mounted and upon which measurements were made to produce the results shown in Fig. 5, the following dimensions, with reference to Fig. 4, were used:

$a$=0.125 inch
$b$=.5 inch
$c$=.125 inch
$d$=2.5 inches
$e$=1 inch
$f$=2.5 inches
$g$=1 inch
$h$=0.5 inch
$j$=2.5 inches
$k$=0.5 inch It is to be understood that the foregoing embodiments are by way of illustration of the principles of the invention, and other arrangements may be devised by those skilled in the art without departing from the spirit and scope of the present invention.

What is claimed is:

1. In an electron discharge device comprising target means and beam forming means for forming and projecting an electron beam toward said target, means for deflecting said electron beam comprising a first pair of spaced deflecting plates between said beam forming means and said target for deflecting said beam in a first coordinate plane and a second pair of spaced deflecting plates between said first pair of plates and said target for deflecting said beam in a second coordinate plane, and means for eliminating abnormal deflection defocusing of said beam comprising first and second spaced electrode members between said first and second pairs of deflecting plates and having mutually transverse elongated apertures therein, the smallest dimension of the aperture of the electrode member nearest said first pair of deflecting plates being at least as great as the maximum spacing between said first pair of plates, and the smallest dimension of the aperture of the other electrode member being at least as great as the minimum spacing between said second pair of plates.

2. In an electron discharge device, the combination as claimed in claim 1 wherein the first and second spaced electrode members are spaced from each other a distance equal to or greater than the smallest dimension of the aperture of the electrode member closest to said second pair of plates.

3. In an electron discharge device, the combination as claimed in claim 1 wherein said first electrode member is spaced from said first pair of deflecting plates a distance equal to one-quarter of the spacing between said two electrode members and the second electrode member is spaced from said second pair of plates a distance equal to one-quarter of the spacing between said two electrode members.

4. An electron discharge device comprising electron gun means for producing an electron beam, said gun means including lens means for focusing said beam, a target opposite said gun means and on which said beam impinges, means including a first and second pair of deflection plates for deflecting said beam in a first and a second coordinate direction, means including said lens means for correcting for defocusing of said beam by a deflection voltage applied to a pair of deflection plates in the direction of deflection of said last mentioned pair of plates, and shielding means between said pairs of deflection plates for correcting for defocusing of said beam by a deflection voltage applied to a pair of deflection plates in a direction coordinate to the direction of deflection of said last mentioned pair of deflection plates, said shielding means including a pair of apertured shield electrodes, the dimensions of said shield electrode apertures and the spacing of said shield electrodes being such that fringing fields from the adjacent pair of deflection plates terminate on said shield electrodes without appreciable distortion of the electric fields within the vicinity of said electron beam and without appreciable leakage of said fringing fields between said pairs of deflection plates.

5. An electron discharge device in accordance with claim 4 wherein said shield electrodes have rectangular apertures therein, said apertures having one dimension substantially parallel to and larger than the spacing between the pair of deflection plates immediately adjacent thereto and the other dimension substantially parallel to and larger than the width of the deflection plates immediately adjacent thereto and said shield electrodes being spaced from each other substantially four times the distance between each shield electrode and the pair of deflection plates adjacent thereto.

6. An electron discharge device in accordance with claim 5 wherein the spacing between said shield electrodes is larger than the smaller dimensions of said aperture of said shield electrode adjacent said pair of deflection plates closest said target.

7. In an electron discharge device comprising target means and beam forming means for forming and projecting an electron beam toward said target, means for deflecting said electron beam comprising a first pair of spaced deflecting plates between said beam forming means and said target for deflecting said beam in a first coordinate plane and a second pair of spaced deflecting plates between said first pair of plates and said target for deflecting said beam in a second coordinate plane, and means for eliminating abnormal deflection defocusing of said beam comprising first and second electrode members between said first and second pairs of deflecting plates, and having mutually transverse elongated apertures therein, the smallest dimension of the aperture of the electrode member nearest said first pair of deflecting plates being at least as great as the maximum spacing between said first pair of plates, the smallest dimension of the aperture of the other electrode member being at least as great as the minimum spacing between said second pair of plates, said electrode members being spaced from each other a distance equal to or greater than the smallest dimension of the aperture of the electrode member closest to said second pair of plates, said first electrode member being spaced from the first pair of deflecting plates a distance equal to one-quarter of the spacing between said two electrode members, and the second electrode member being spaced from said second pair of plates a distance equal to one-quarter of the spacing between the said two electrode members.

References Cited in the file of this patent

UNITED STATES PATENTS

| | | |
|---|---|---|
| 1,779,794 | Ackermann | Oct. 28, 1930 |
| 2,080,449 | Van Ardenne | May 18, 1937 |
| 2,114,572 | Ressler | Apr. 19, 1938 |
| 2,185,239 | Van Ardenne | Jan. 2, 1940 |